United States Patent
Jamali et al.

(10) Patent No.: US 12,416,842 B2
(45) Date of Patent: Sep. 16, 2025

(54) GRADIENT-INDEX LIQUID CRYSTAL LENSES WITH ADJUSTABLE FLYBACK REGIONS

(71) Applicant: Meta Platforms Technologies, LLC, Menlo Park, CA (US)

(72) Inventors: Afsoon Jamali, Issaquah, WA (US); Changwon Jang, Kirkland, WA (US); Zhimin Shi, Bellevue, WA (US); Sho Nakahara, Bothell, WA (US); Eric Stratton, Snohomish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/485,498

(22) Filed: Oct. 12, 2023

(65) Prior Publication Data

US 2024/0126134 A1    Apr. 18, 2024

Related U.S. Application Data

(60) Provisional application No. 63/379,241, filed on Oct. 12, 2022.

(51) Int. Cl.
G02F 1/29    (2006.01)

(52) U.S. Cl.
CPC .......... *G02F 1/29* (2013.01); *G02F 2201/122* (2013.01)

(58) Field of Classification Search
CPC ....... G02F 1/29; G02F 2201/122; G02F 1/294
See application file for complete search history.

(56) References Cited

U.S. PATENT DOCUMENTS

| | | | |
|---|---|---|---|
| 2009/0027650 A1* | 1/2009 | Yamazoe | G03F 1/36 430/5 |
| 2013/0128334 A1* | 5/2013 | Stephen | G02B 5/189 359/279 |
| 2017/0082858 A1* | 3/2017 | Klug | A61B 3/10 |
| 2018/0045960 A1* | 2/2018 | Palacios | G02F 1/1343 |

* cited by examiner

*Primary Examiner* — Mariam Qureshi
(74) *Attorney, Agent, or Firm* — Greenberg Traurig, LLP

(57) ABSTRACT

The disclosed system may include at least one gradient-index liquid crystal lens. The system may include a selection module that selects a viewing angle. The system may also include an adjustment module that dynamically adjusts a phase reset property of the gradient-index liquid crystal lens in response to the selected viewing angle. Various other devices, systems, and methods are also disclosed.

20 Claims, 11 Drawing Sheets

300(a)

300(b)

GRADIENT-INDEX LIQUID CRYSTAL LENSES WITH ADJUSTABLE FLYBACK REGIONS

CROSS-REFERENCE TO RELATED APPLICATION

This application claims the benefit of priority under 35 U.S.C. § 119(e) of U.S. Provisional Application No. 63/379,241, filed Oct. 12, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, the drawings demonstrate and explain various principles of the present disclosure.

Figure 1:
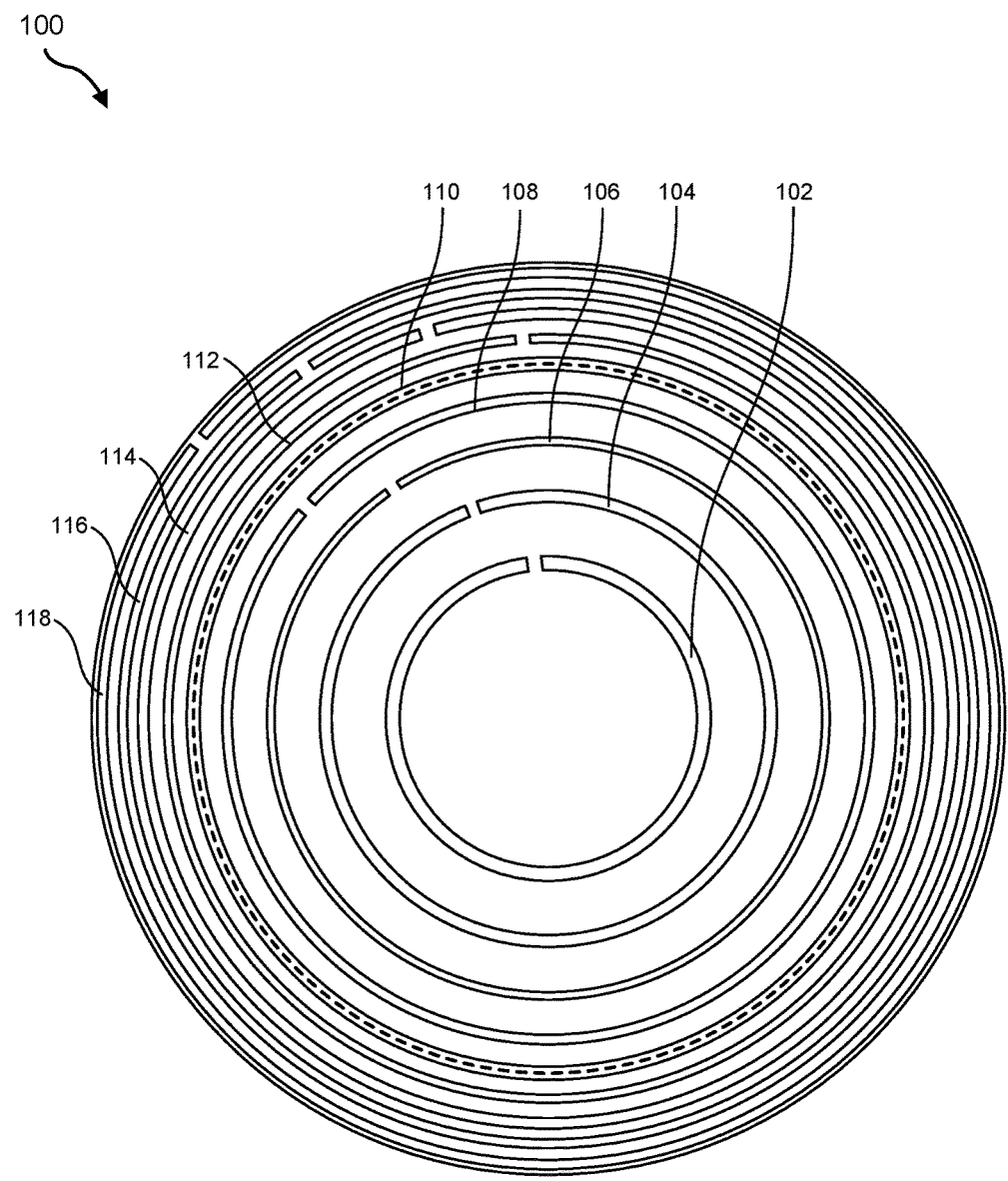
FIG. 1 illustrates an example gradient-index liquid crystal ("GRIN LC") lens according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Across various optical engineering applications including eyeglasses, contact lenses, and optical elements in augmented reality (AR) and virtual reality (VR) systems, liquid crystal (LC) lenses may provide a number of advantages due to their electrically tunable focusing capability, where the associated optical mechanism is based on a spatially localized modulation of light speed resulting from LC molecular orientations driven by applied electric fields.

In such context the realization of a continuous distribution of phase retardation across larger aperture (>10 mm) LC lenses may be challenged by the limited birefringence (<0.5) of LC materials as well as their mechanically compliant nature. In some embodiments, a gradient-index configuration may be used to provide tunability of focus quality.

Gradient-index (GRIN) optics refers to a branch of optics where optical effects are produced by a spatial gradient in the refractive index of a material. A gradual refractive index variation may be used to manufacture lenses having planar surfaces, for example, or to reduce aberrations in imaging applications. In an LC lens having an axial gradient configuration, the refractive index may vary along the optical axis of an inhomogeneous medium such that surfaces of constant index are planes that are oriented perpendicular to the optical axis. In a radial/cylindrical refractive index gradient configuration, on the other hand, the index profile may vary continuously from a centerline of the optical axis to the periphery along the transverse direction in such a way that surfaces of constant index are concentric cylinders located about the optical axis. Hybrid GRIN LC lenses having both an axial and a radial/cylindrical refractive index gradient configuration are also contemplated.

GRIN-type LC lenses may be configured to exhibit a gradient distribution of refractive index in response to a spatially inhomogeneous electric field that is applied across the LC layer(s). As such, the lens power of a GRIN-type LC lens may also be continuously tunable. In some instantiations, there may be a continuous variation of the refractive index within the lens material. An LC lens may be configured in both planar and non-planar (e.g., concave or convex) geometries.

In some examples, a tunable architecture may include a voltage-tunable layer formed over the LC layer(s) within the optical aperture of the lens. During operation, different voltages may be applied to different areas of the voltage-tunable layer, which may be used to locally tune the refractive index of the LC material. The voltage-tunable layer may have any suitable design. For example, the voltage-tunable layer may include a plurality of discrete, ring electrodes formed over the LC layer(s) within the optical aperture of the lens. During operation, a different voltage may be applied to each electrode, which may be used to locally tune the refractive index of the LC material. In some examples, a tunable layer formed over the LC layer may include a layer with continuously variable resistance.

In some examples, the lens may have a Fresnel structure, where phase reset boundaries may correspond to abrupt changes in voltage. The abrupt change in voltage may produce a fringing field, which may cause liquid crystals near the phase reset boundaries to twist (e.g., away from standard orientations and/or to orientations that produce undesired optical effects). In some examples, the twisting of the crystals at the phase reset boundaries may induce performance liabilities, including a loss of transmission and the generation of optical artifacts such as scatter.

As used herein, the terms "scatter" and "clarity" may refer to an optical phenomenon associated with the transmission of light through a medium. As will be appreciated, scatter may be associated with an amount of light that is subject to wide angle scattering (e.g., at an angle greater than 2.5° from normal) and a corresponding loss of transmissive contrast, whereas clarity may relate to an amount of light that is subject to narrow angle scattering (e.g., at an angle less than 2.5° from normal) and an attendant loss of optical sharpness.

The present disclosure is generally directed to GRIN LC Fresnel-type lenses with adjustable phase resets (e.g., adjusting the placement and/or other properties of the phase resets) to reduce the density of phase resets at locations of the lens transmitting image portions of importance (e.g., as determined based on user gaze), and/or to reduce light scattering at phase reset boundaries. In some examples, the reduction of light scattering may result in lenses with less scatter and/or more clarity. By dynamically adjusting Fresnel resets of the lens (e.g., while maintaining the same optical power), scattering of important image regions may be reduced. Fresnel resets may be dynamically adjusted by adjusting a voltage profile of the lens using a variable resistance film. In some examples, the voltage profile may be adjusted to prevent high voltage from being adjacent to low voltage. In some examples, Fresnel resets may be adjusted to reduce the slope of the Fresnel resets for important image regions. In a stacked-cell design, Fresnel resets may be shifted to account for the incoming angle of light.

In some examples, in order to reduce scatter, a lens may include a mask that blocks light at and around phase reset boundaries (e.g., to block areas through which scattered light would otherwise pass). Lens stacks with adjustable phase resets described herein may adjust the locations of phase resets to align phase reset boundaries (and thus, e.g., masks) at areas of interest (e.g., based on user gaze).

In some embodiments, the slope of the phase resets may vary in relation to the viewing angle through the lens. Thus, at more acute viewing angles the lens may have steeper phase resets and at more oblique viewing angles the lens may have more gradual phase resets. As may be appreciated, this may correspond to phase resets closer to the center of the lens being steeper and becoming more gradual toward the periphery of the lens.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 illustrates an example gradient-index liquid crystal ("GRIN LC") lens 100 according to some embodiments. As shown in FIG. 1, lens 100 may include a driving electrode array. The illustrated driving electrode array may include a plurality of driving electrodes (e.g., electrodes 102, 104, 106, 108, 112, 114, 116, and 118) that are arranged in concentric rings.

The driving electrode array may be divided into a plurality of segments. In the example shown in FIG. 1, the driving electrode array may be divided at a ring 110 into two segments (an inner segment within ring 110 and an outer segment outside ring 110). In some examples, neighboring driving electrodes may be separated by ring-shaped gap regions and resistors may connect pairs of neighboring driving electrodes within each segment of the driving electrode array of lens 100. However, electrodes 108 and 112 may not be electrically connected to each other via a resistor or other means. Accordingly, the two segments of the driving electrode array may produce distinct voltage gradients in independently operable lens regions in lens 100.

In some examples, a lens system may include lens 100 and an eye tracking module. Based on the tracked gaze of a user's eye, the lens system may activate a segment of lens 100. Thus, instead of all phase resets being activated, particular regions of phase resets may be activated, thereby improving image quality.

Figure 2:
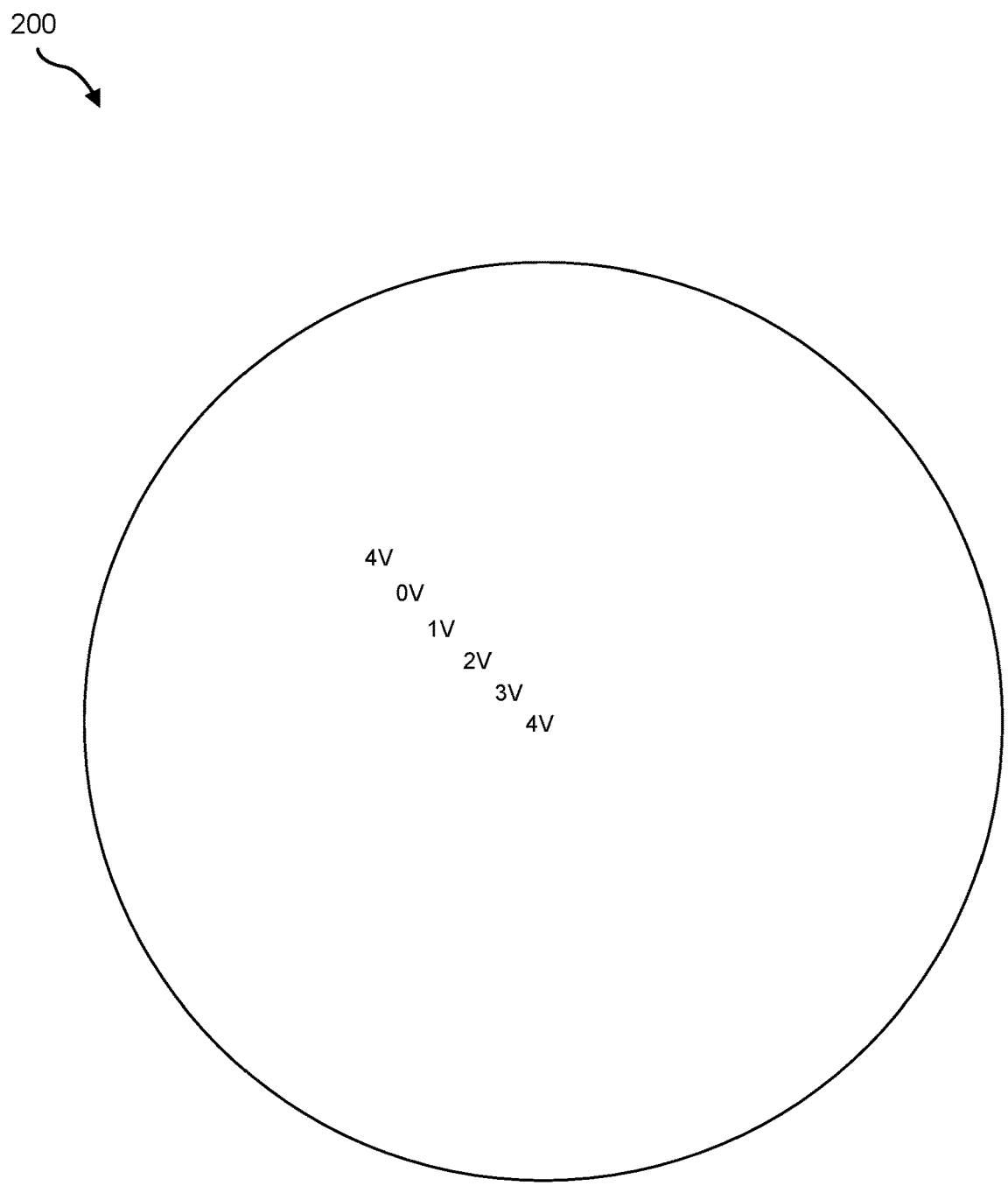
FIG. 2 illustrates another example GRIN LC lens according to some embodiments.

FIG. 2 illustrates another example GRIN LC lens 200 according to some embodiments. As shown in FIG. 2, lens 200 may have a transparent layer with variable-resistance (and, so, variable-voltage) capabilities.

By way of example, GRIN LC lens 200 may include a primary electrode, a secondary electrode overlapping at least a portion of the primary electrode, and a liquid crystal layer disposed between the primary electrode and the secondary electrode. The primary electrode may be a contiguous layer having a spatially variable resistance, and may include one or more transparent conducting oxides such as indium oxide, tin oxide, indium tin oxide, indium gallium zinc oxide, and the like. The secondary electrode may be configured as a ground electrode. In some embodiments, the electrodes (e.g., the primary electrode and the secondary electrode) may have a thickness of approximately 1 nm to approximately 1000 nm, with an example thickness of approximately 10 nm to approximately 50 nm.

GRIN LC lens 200 may further include a layer of a dielectric or insulating material between the primary electrode and the LC layer. The presence or absence of a dielectric or insulating layer between the primary electrode and the LC layer may be used to locally vary the magnitude or direction of an electric field applied to the LC layer, and correspondingly tune the LC layer's refractive index.

As disclosed herein, the formation of a continuous transparent electrode having a variable resistance may be achieved using a variety of methods and structures. According to some embodiments, the electrode resistance may be controlled spatially by engineering the doping profile within or across the electrode, i.e., at the atomic level. Doping changes the electron and hole carrier concentrations of a host material at thermal equilibrium. A doped electrode layer may be p-type or n-type. As used herein, "p-type" refers to the addition of impurities that create a deficiency of valence electrons, whereas "n-type" refers to the addition of impurities that contribute free electrons.

The type and amount of doping may be controlled during and/or after electrode formation. By way of example, printing techniques such as ink jet printing may be used to locally deposit different electrode chemistries having a desired dopant concentration. According to further examples, ion implantation, e.g., in conjunction with photolithographic masking, may be used to locally define a doping profile within a previously-formed electrode. A doping profile may vary along a radial dimension of an LC lens, for example.

According to further embodiments, an electrode may be configured as an optical composite material. A composite electrode may include a regular or irregular distribution of domains (i.e., of a second phase) that locally influence the resistivity of the electrode.

A further approach may include forming an electrode having a variable structure along its thickness dimension. Such an electrode may be continuous in the x-y plane and accordingly avoid the formation of haze due to gaps in the electrode architecture across the aperture of the lens. Such a variable electrode structure may include an electrode having a variable thickness. The phase profile in such a configuration may be responsive to both an applied voltage and an applied frequency.

According to still further embodiments, a refractive index tunable LC layer may be achieved by applying a voltage to a patterned electrode where adjacent portions of the electrode within the x-y plane (e.g., ring electrode architecture)

are capacitively coupled via an intervening patterned insulator. Without wishing to be bound by theory, strong capacitive coupling may be achieved in examples where the dielectric constant of the insulator is much greater than the dielectric constant of the LC material.

In addition to, or in lieu of, locally defining the structure of the electrode itself, a voltage applied across the LC layer may be manipulated by incorporating a patterned or otherwise structured dielectric layer between the electrode and the LC. For instance, the primary electrode may be continuous, whereas the insulator layer may be patterned. Such patterned insulator layer may include a spatially variable thickness, which may cause spatially variable capacitive coupling between LC and primary electrode. As a result of controlled capacitive coupling, a refractive index gradient may be obtained.

According to a further embodiment, a difference in coupling strength may also be achieved by varying the thickness of an LC substrate, e.g., a glass substrate. Photolithography in combination with dry etching, for example, may be used to locally define the substrate thickness and accordingly allow for local adjustments in the capacitance of an associate cell.

In some embodiments, a lens system may dynamically adjust the voltage across lens 200 to adjust one or more phase reset boundaries of lens 200. In some examples, the lens system may adjust the phase reset boundaries at least in part responsively to a user's gaze as determined by an eye-tracking system.

Figure 3:
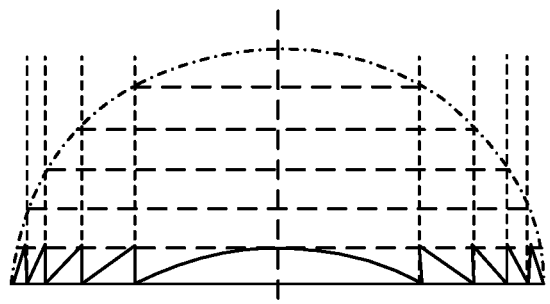
FIG. 3 illustrates example Fresnel reset patterns for example GRIN LC lens designs according to some embodiments.
Figure 3:
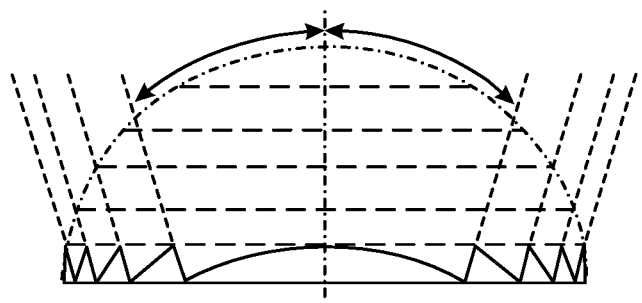

FIG. 3 illustrates example Fresnel reset patterns 300(a) and 300(b) for example GRIN LC lens designs. As shown in FIG. 3, a Fresnel reset pattern 300(a) may use abrupt resets. A Fresnel reset pattern 300(b) may use gradual or "sloped" resets (e.g., produced by a gradual, rather than abrupt, change in voltage near the Fresnel reset boundaries of the GRIN LC Fresnel-type lens). The sloped reset design may mitigate a fringing field, which may, in turn, mitigate or eliminate twisting of the liquid crystals near the reset boundaries, thereby potentially reducing scatter. In some examples, a lens system may dynamically adjust resets (e.g., to become gradual, as in pattern 300(b)). For example, the lens system may dynamically adjust selected resets based at least in part on a user's gaze as determined by an eye-tracking system.

Figure 4:
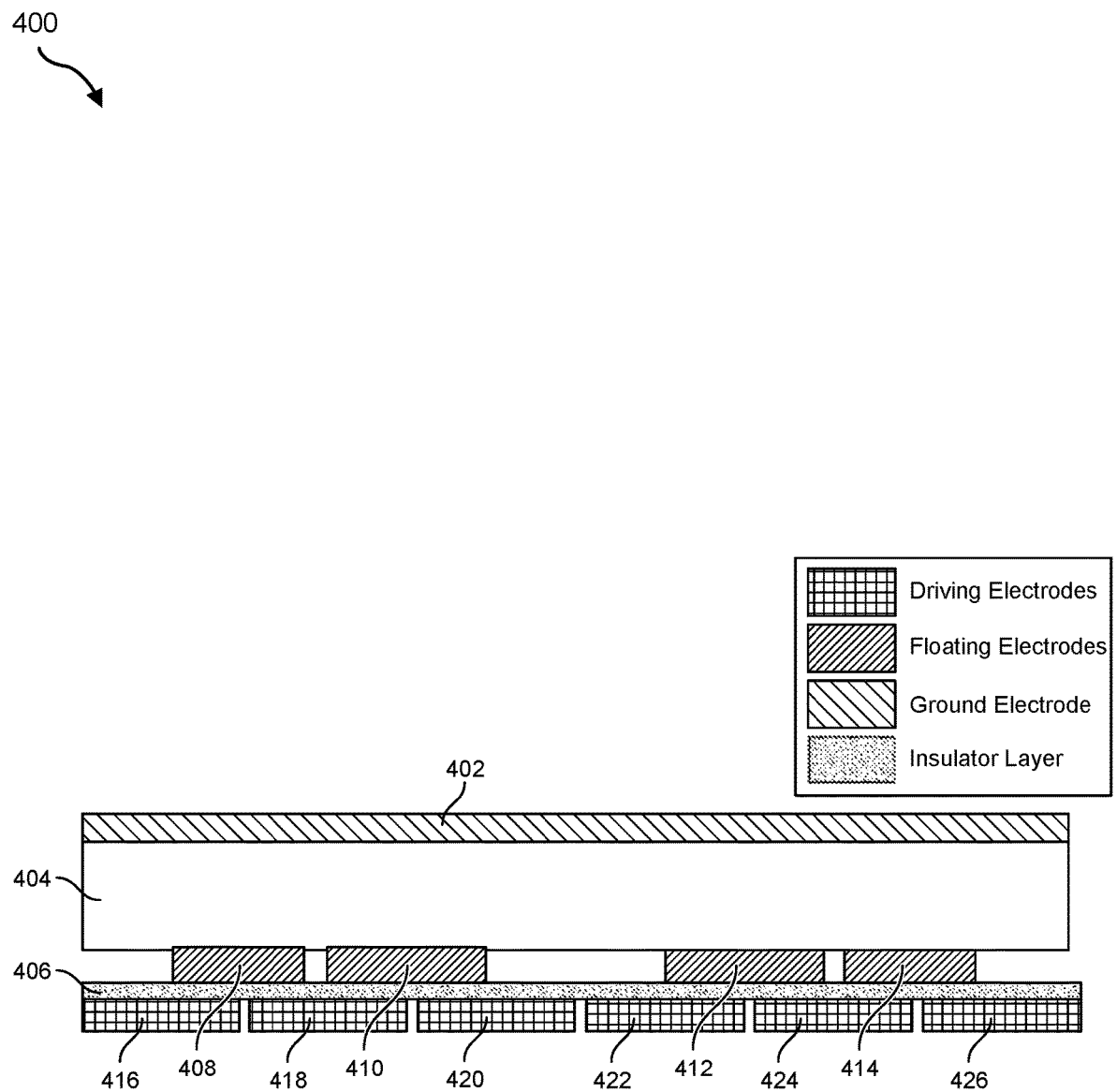
FIG. 4 illustrates an example electrode arrangement for an example GRIN LC lens according to some embodiments.

FIG. 4 illustrates an example electrode arrangement for an example GRIN LC lens 400 according to some embodiments. As shown in FIG. 4, lens 400 may include a ground electrode 402, a liquid crystal layer 404, floating electrodes 408, 410, 412, and 414, an insulator layer 406, and driving electrodes 416, 418, 420, 422, 424, and 426. By way of example, voltages of floating electrodes 408, 410, 412, and 414 may be 5.29 volts, 5.69 volts, 1.46 volts, and 1.59 volts, respectively. In this example, voltages of driving electrodes 416, 418, 420, 422, 424, and 426 may be 5.12 volts, 5.48 volts, 5.90 volts, 1.13 volts, 1.53 volts, and 1.63 volts, respectively. Thus, a phase reset boundary may exist between driving electrodes 420 and 422.

Figure 5:
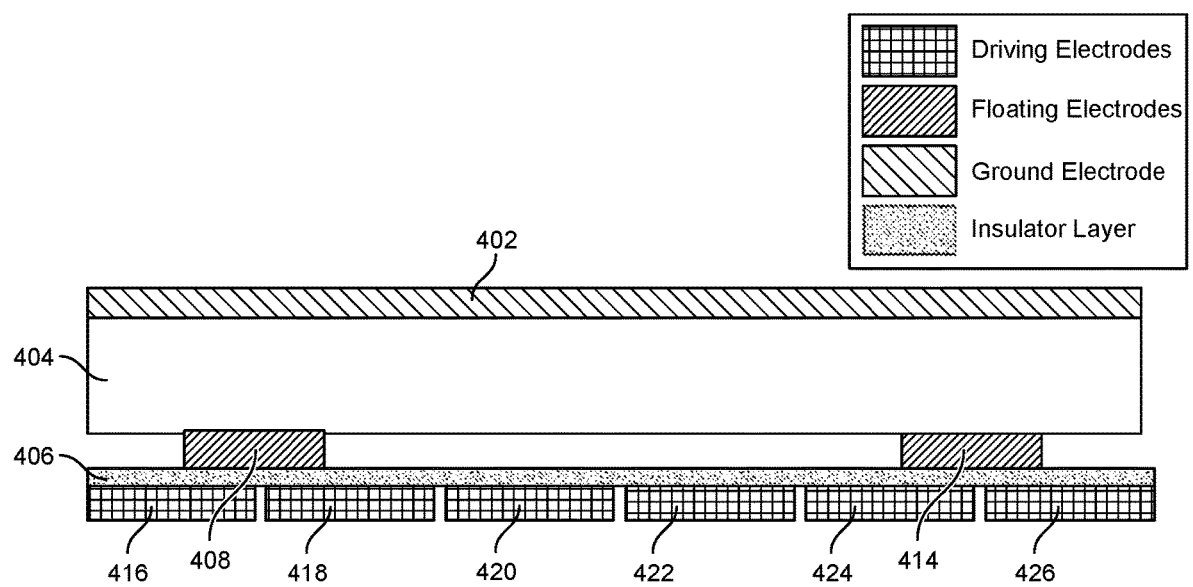
FIG. 5 illustrates another example electrode arrangement for an example GRIN LC lens according to some embodiments.

FIG. 5 illustrates another example electrode arrangement for an example GRIN LC lens 500 according to some embodiments. As shown in FIG. 5, lens 500 may also include ground electrode 402, liquid crystal layer 404, floating electrodes 408 and 414, and insulator layer 406, and driving electrodes 416, 418, 420, 422, 424, and 426. However, lens 500 may exclude floating electrodes above driving electrodes around phase reset boundaries, such as floating electrodes 410 and 412. The smaller sampling rate around the phase reset boundaries may help to reduce the spatial distribution of the electric field and, thus, reduce scattering.

Figure 6:
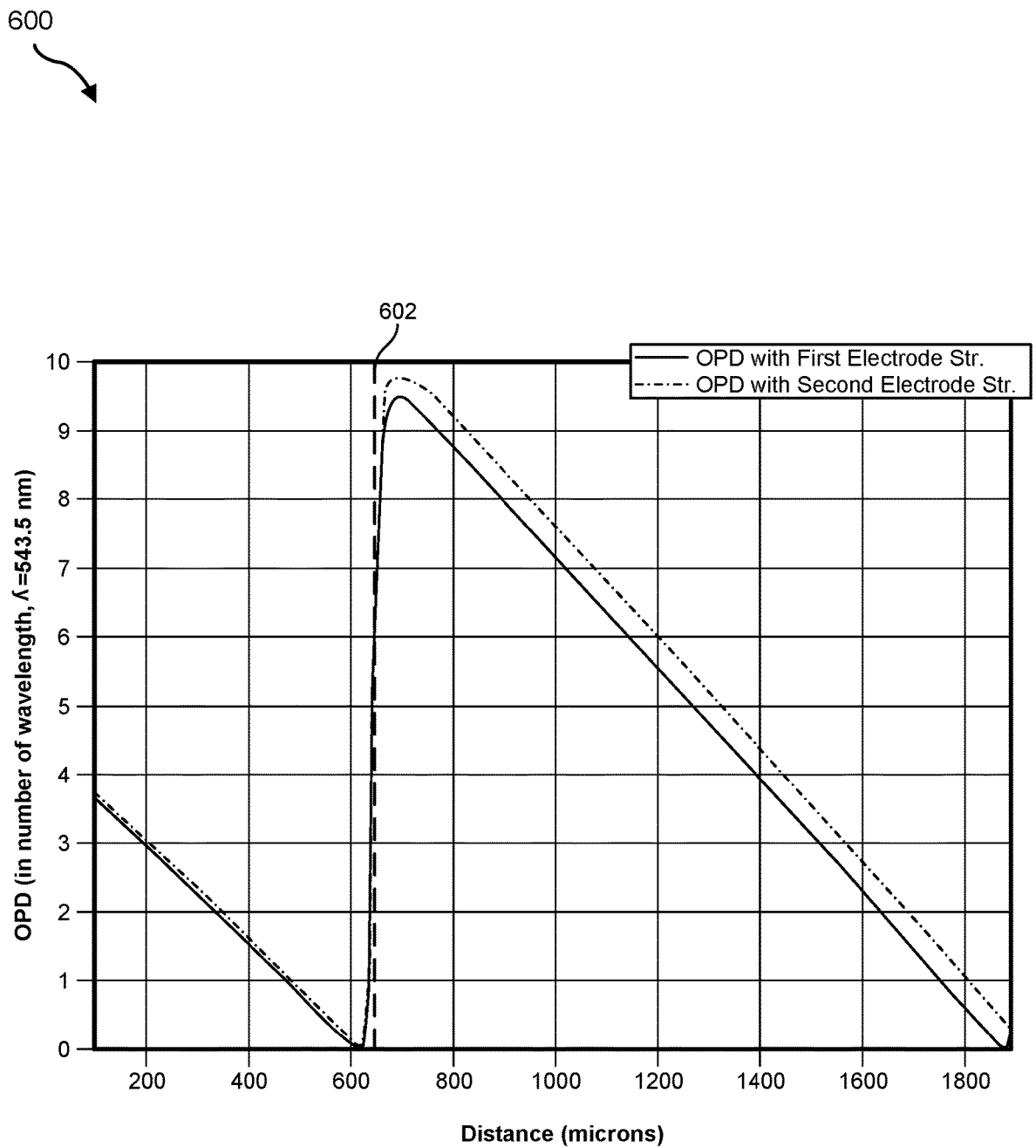
FIG. 6 shows a graph of example optical path differences of the GRIN LC lenses of FIGS. 4 and 5.

FIG. 6 shows a graph 600 of example optical path differences of the GRIN LC lenses of FIGS. 4 and 5. As shown in FIG. 6, graph 600 illustrates the optical path difference of a lens with a first electrode structure (e.g., that of FIG. 4) and that of a lens with a second electrode structure (e.g., that of FIG. 5). Graph 600 also shows a position 602 of a phase reset boundary. As can be appreciated, the optical path difference depth is greater with lens 500 than with lens 400. The greater optical path difference depth may result in a lower phase step per electrode around the phase reset boundary. Furthermore, the width of the flyback region may be less with the structure of lens 500 compared with the structure of lens 400.

Figure 7:
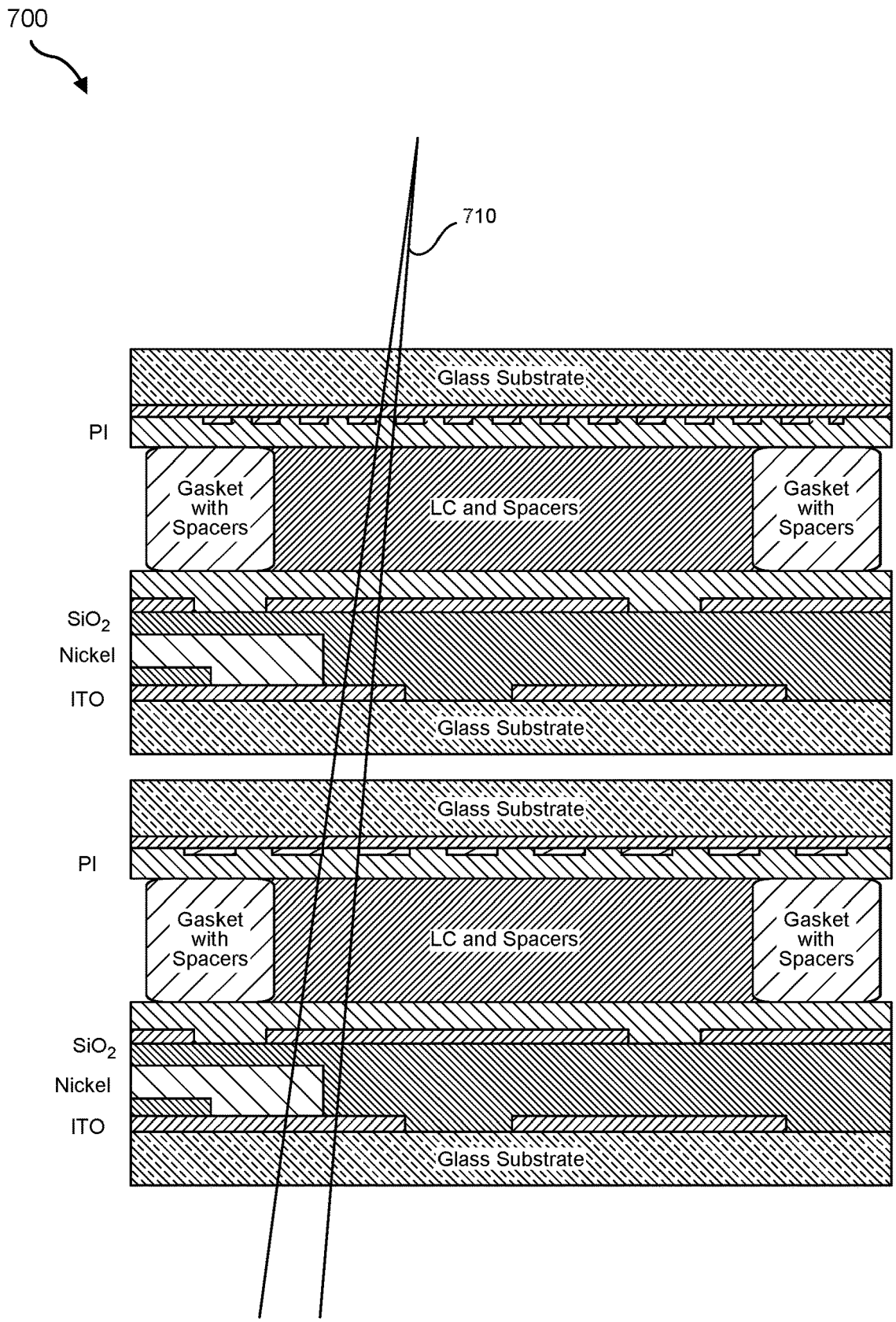
FIG. 7 illustrates an example stack of GRIN LC lenses according to some embodiments.

FIG. 7 illustrates an example GRIN LC lens stack 600. As shown in FIG. 7, GRIN LC lens stack 700 may include two GRIN LC lenses in tandem. The two GRIN LC lenses in tandem may provide cumulative optical power. In addition, because each GRIN LC lens is thinner than a single GRIN LC lens of equivalent optical power, stack 600 may have a faster response time and a wider viewing angle than a single LC lens of equivalent optical power would have.

Furthermore, in some examples, the two GRIN LC lenses of stack 700 may have different optical powers from each other, each lens contributing a different proportion to the cumulative optical power of stack 700. The different optical powers of the two GRIN LC lenses may correspond to different Fresnel reset patterns, and, therefore, to different mask patterns. The different mask patterns may result in greater alignments of the mask patterns (given parallax) from certain viewing angles. Thus, for example, a cone of vision 710 may be unobstructed by the masks of both lenses given the specific mask patterns of each lens.

In some examples, a lens system may dynamically adjust the Fresnel reset patterns of the two GRIN LC lenses and may, accordingly, adjust the mask patterns of the two GRIN LC lenses. As may be appreciated, stack 700 may achieve a given optical power with a variety of combinations of optical powers of the two GRIN LC lenses and, thus, with a variety of combinations of Fresnel reset patterns and mask patterns. Accordingly, in some examples, when a lens system targets a total optical power for stack 700, the lens system may select optical powers for the individual GRIN LC lenses (and/or may select Fresnel reset patterns) based at least in part on resulting mask patterns. In particular, the lens system may select a configuration that results in a set of mask patterns that are more aligned (e.g., that result in less overall obstruction) for a selected viewing angle. In some examples, the lens system may select the viewing angle to optimize based at least in part on a user's eye gaze, as determined, e.g., by an eye-tracking system.

Figure 8:
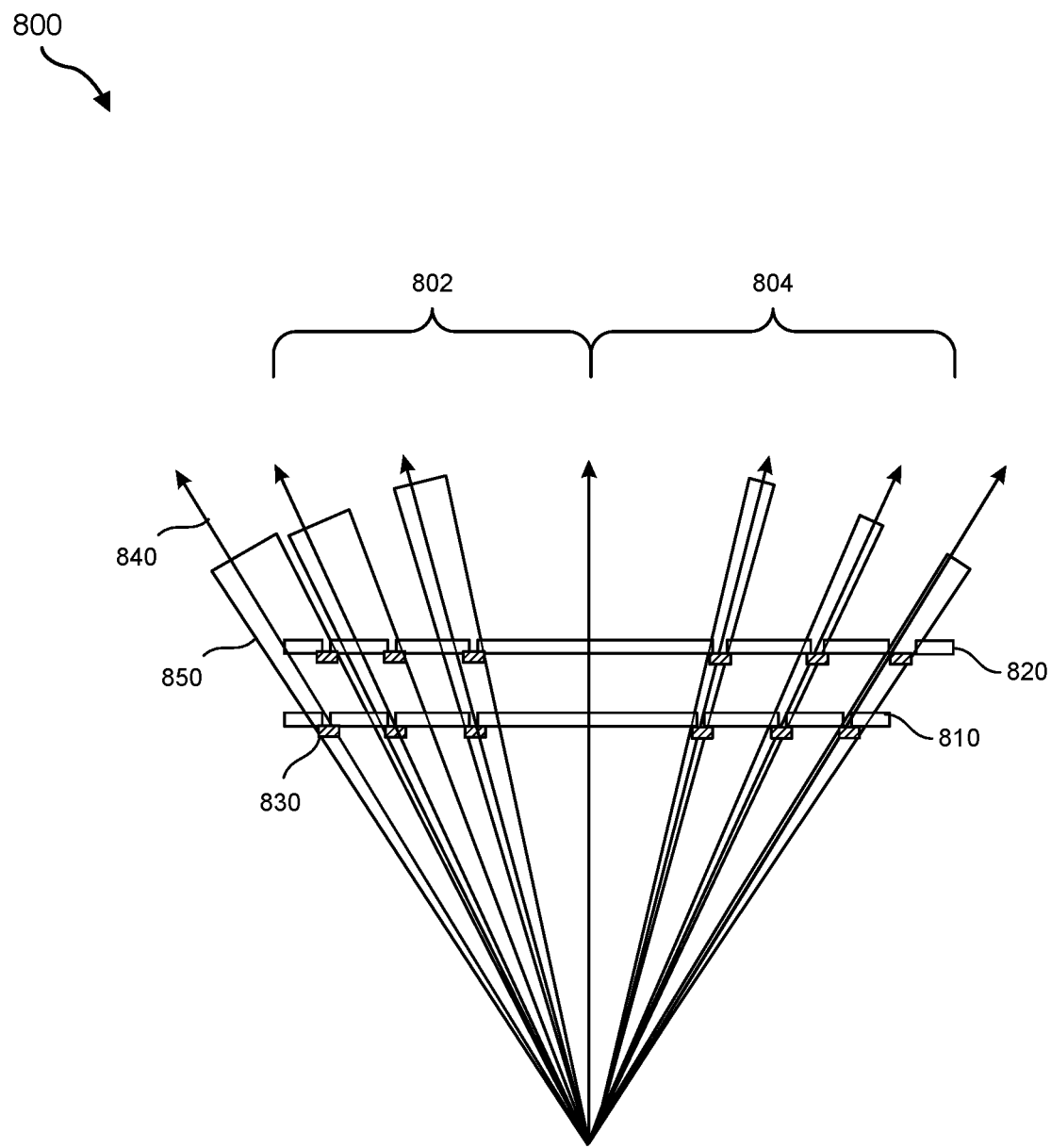
FIG. 8 illustrates an example comparison between masking patterns of a stack of GRIN LC lenses according to some embodiments.

FIG. 8 illustrates an example comparison between masking patterns of a stack 800 of GRIN LC lenses according to some embodiments. As shown in FIG. 8, stack 800 may include a lens 810 and a lens 820. Lenses 810 and 820 may have various masks 830. A side 802 of stack 800 may have identical masking patterns between lenses 810 and 820, while side 802 of stack 800 has differing masking patterns between lenses 810 and 820. Although the masking patterns of lenses 810 and 820 on side 802 of stack 800 are vertically aligned, due to the distance between lenses 810 and 820 (and, in particular, between the masking rows of the lenses 810 and 820), the masks of lenses 810 and 820 on side 802 may exhibit parallax—e.g., be misaligned from various oblique viewing angles. Thus, for example, various lines of sight 840 may intersect with stack 800. However, due to masks 830, lines of sight 840 may be obstructed within cones 850. As shown in FIG. 8, the cones of obstruction are wider on side 802 than on side 804 owing to parallax-caused misalignment of masking patterns, while the cones of obstruction are narrower on side 804 owing to differing masking patterns of lenses 810 and 820 (which, in turn, may correspond to differing Fresnel reset patterns between lenses 810 and 820).

Figure 9:
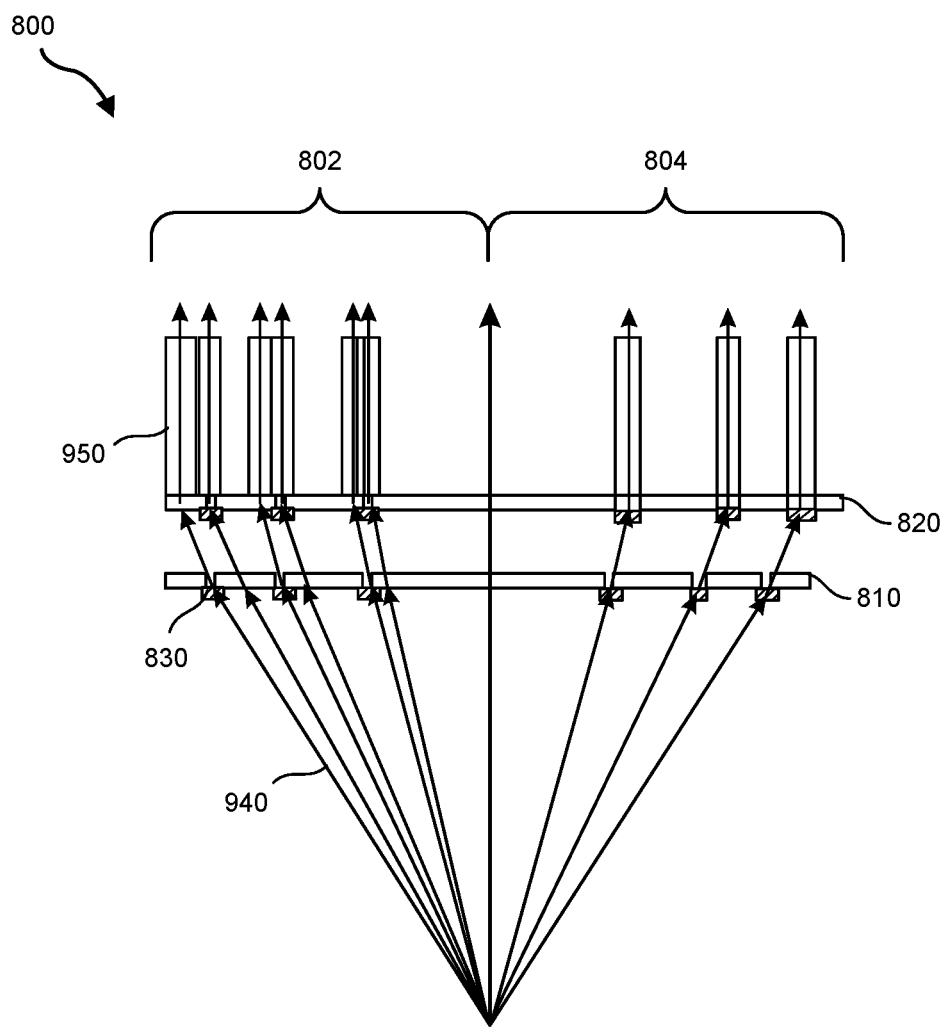
FIG. 9 illustrates another example comparison between masking patterns of a stack of GRIN LC lenses according to some embodiments.

FIG. 9 illustrates another example comparison between masking patterns of a stack 800 of GRIN LC lenses. As shown in FIG. 9, ray paths 940 may intersect various of masks 830 as they cross lenses 810 and 820, resulting in obstruction areas 950. As can be appreciated, the obstruction areas on side 802 of stack 800 are wider than those on side 804 of stack 800. Thus, a lens system described herein may dynamically adjust the Fresnel resets of lenses 810 and 820 to result in a masking pattern as shown on side 804 rather than on side 802 (e.g., such that the masking patterns are more closely aligned for one or more selected viewing angles as determined, e.g., by an eye-tracking system that detects the direction of a user's eye gaze.)

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
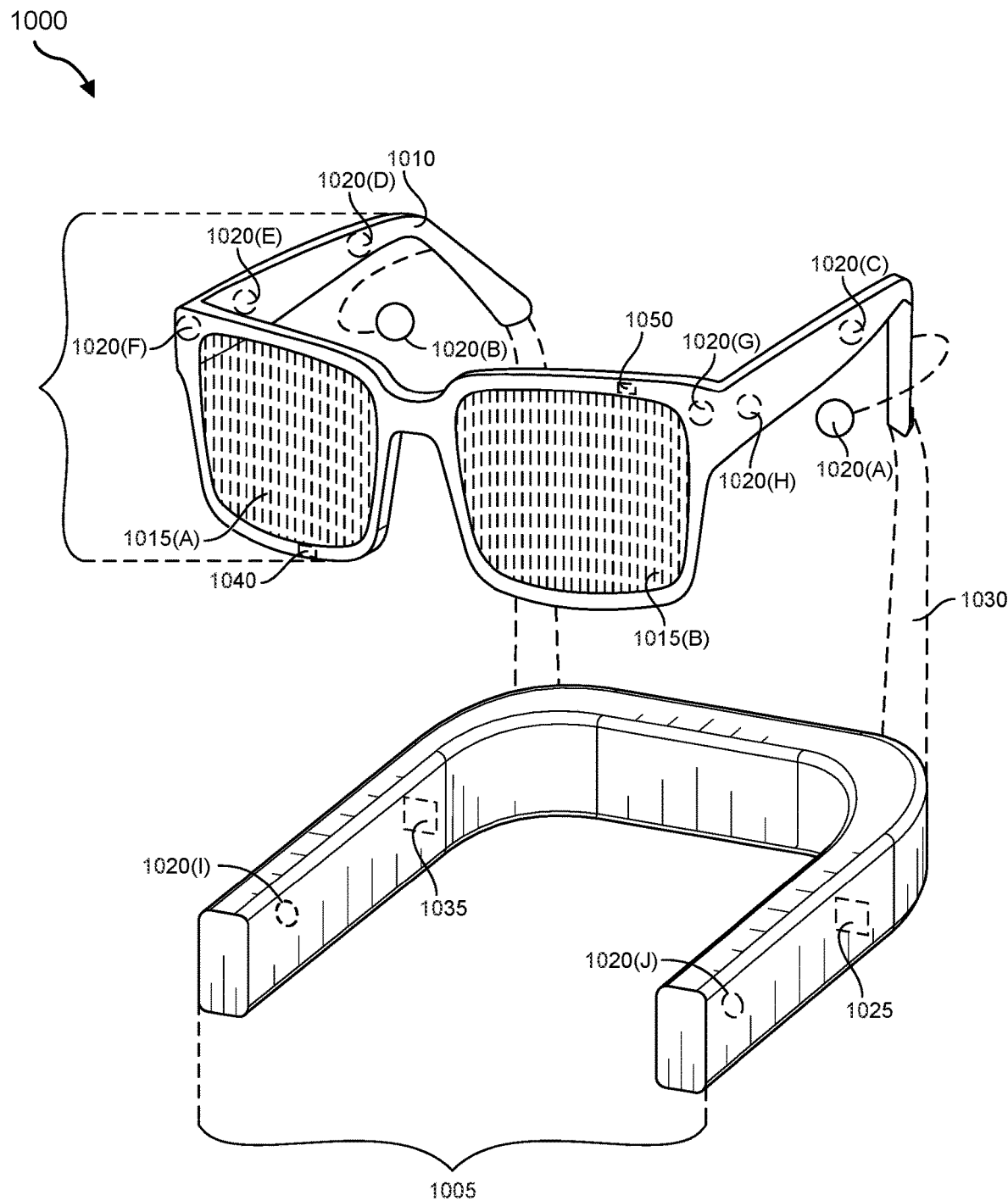
FIG. 10 is an illustration of exemplary augmented-reality glasses that may be used in connection with embodiments of this disclosure.
Figure 11:
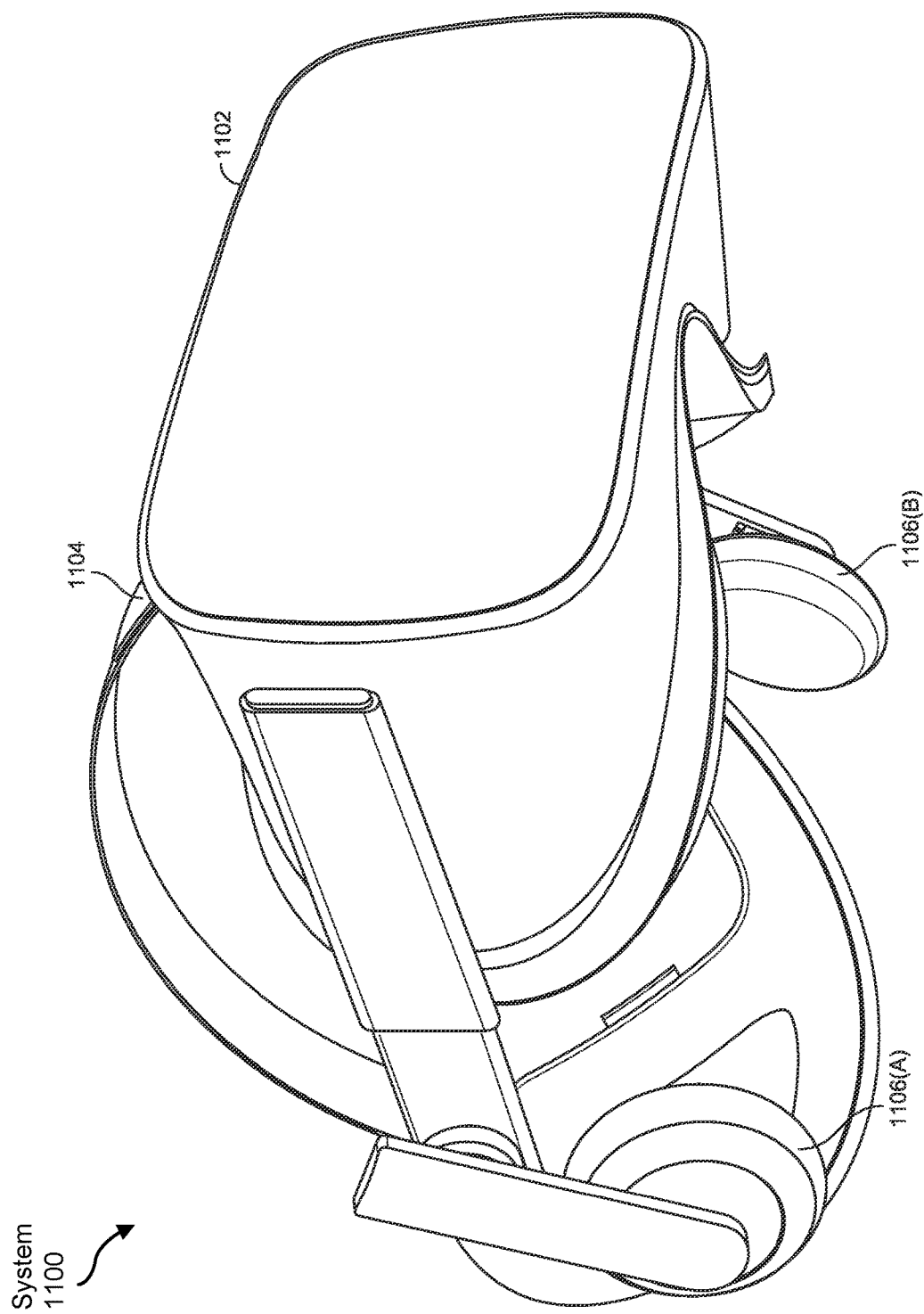
FIG. 11 is an illustration of an exemplary virtual-reality headset that may be used in connection with embodiments of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(I) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system comprising:
    at least one gradient-index liquid crystal lens;
    an eye-tracking device that detects a direction of a user's gaze;
    a selection module that:
        detects at least one image region of interest on the gradient-index liquid crystal lens based at least in part on the direction of the user's gaze; and
        selects a viewing angle based at least in part on the image region of interest; and
    an adjustment module that dynamically adjusts a phase reset property of the gradient-index liquid crystal lens based at least in part on the viewing angle.

2. The system of claim 1, wherein the gradient-index liquid crystal lens comprises a voltage-tunable layer adjacent to a liquid crystal layer.

3. The system of claim 2, wherein the adjustment module dynamically adjusts the phase reset property of the liquid crystal layer by adjusting the voltage-tunable layer.

4. The system of claim 3, wherein the voltage-tunable layer comprises a set of electrodes that control a refractive index of the liquid crystal layer.

5. The system of claim 1, further comprising a mask configured to block light at one or more phase reset boundaries.

6. The system of claim 1, further comprising a head-mounted display, wherein the at least one gradient-index liquid crystal lens is configured to project one or more images from the head-mounted display.

7. The system of claim 1, wherein adjusting the phase reset property of the gradient-index liquid crystal lens comprises reducing a slope of one or more Fresnel resets at the image region of interest on the gradient-index liquid crystal lens.

8. The system of claim 7, wherein adjusting the phase reset property of the gradient-index liquid crystal lens comprises reducing a difference between voltages applied to adjacent Fresnel resets at the image region of interest.

9. The system of claim 1, wherein the adjust module maintains a consistent optical power of the gradient-index liquid crystal lens before and after dynamically adjusting the phase reset property.

10. The system of claim 1, wherein adjusting the phase reset property of the gradient-index liquid crystal lens comprises reducing a density of Fresnel resets in the image region of interest.

11. The system of claim 1, wherein adjusting the phase reset property of the gradient-index liquid crystal lens comprises reducing light scattering at the image region of interest.

12. The system of claim 1, wherein adjusting the phase reset property of the gradient-index liquid crystal lens comprises shifting Fresnel resets at the image region of interest to account for incoming light.

13. A device comprising:
    at least one gradient-index liquid crystal lens;
    an eye-tracking device that detects a direction of a user's gaze;
    a selection module that:
        detects at least one image region of interest on the gradient-index liquid crystal lens based at least in part on the direction of the user's gaze; and
        selects a viewing angle based at least in part on the image region of interest; and
    an adjustment module that dynamically adjusts a phase reset property of the gradient-index liquid crystal lens based at least in part on the viewing angle.

14. The device of claim 13, wherein the gradient-index liquid crystal lens comprises a voltage-tunable layer adjacent to a liquid crystal layer.

15. The device of claim 14, wherein the adjustment module dynamically adjusts the phase reset property of the liquid crystal layer by adjusting the voltage-tunable layer.

16. The device of claim 15, wherein the voltage-tunable layer comprises a set of electrodes that control a refractive index of the liquid crystal layer.

17. The device of claim 16, wherein the set of electrodes comprises a set of ring electrodes.

18. The device of claim 17, wherein the adjustment module is configured to apply different voltages to different electrodes within the set of electrodes.

19. The device of claim 13, wherein the gradient-index liquid crystal lens comprises a variable resistance film that controls a refractive index of a liquid crystal layer.

20. An artificial-reality headset comprising:
    a head-mounted display;
    at least one gradient-index liquid crystal lens that is configured to project one or more images from the head-mounted display;
    an eye-tracking device that detects a direction of a user's gaze;
    a selection module that:
        detects at least one image region of interest on the gradient-index liquid crystal lens based at least in part on the direction of the user's gaze; and
        selects a viewing angle based at least in part on the image region of interest; and
    an adjustment module that dynamically adjusts a phase reset property of the gradient-index liquid crystal lens based at least in part on the viewing angle.

* * * * *